(12) United States Patent
Muendel (10) Patent No.: US 8,620,121 B2
(45) Date of Patent: Dec. 31, 2013

(54) TAPERED FIBER RETROREFLECTOR

(75) Inventor: Martin H. Muendel, Oakland, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 1355 days.

(21) Appl. No.: 12/046,506

(22) Filed: Mar. 12, 2008

(65) Prior Publication Data

US 2009/0232453 A1   Sep. 17, 2009

(51) Int. Cl.
*G02B 6/26* (2006.01)
*G02B 6/32* (2006.01)

(52) U.S. Cl.
USPC ............................................. 385/43; 385/34

(58) Field of Classification Search
USPC ...................................... 385/35, 43
See application file for complete search history.

(56) References Cited

U.S. PATENT DOCUMENTS

| | | | |
|---|---|---|---|
| 4,737,006 A | 4/1988 | Warbrick | 385/33 |
| 6,014,389 A | 1/2000 | Wiest | 372/6 |
| 6,324,326 B1 * | 11/2001 | Dejneka et al. | 385/123 |
| 6,330,382 B1 * | 12/2001 | Harshbarger et al. | 385/28 |
| 6,488,414 B1 | 12/2002 | Dawes et al. | 385/79 |
| 7,088,756 B2 | 8/2006 | Fermaan et al. | 372/45.013 |
| 7,190,511 B2 | 3/2007 | Galvanauskas et al. | 359/341.1 |
| 7,228,033 B2 | 6/2007 | Bhagavatula et al. | 385/35 |
| 2004/0218635 A1 | 11/2004 | Schlueter et al. | 372/6 |
| 2006/0132904 A1 | 6/2006 | Galvanauskas et al. | 359/341.1 |
| 2007/0172174 A1 | 7/2007 | Scerbak et al. | 385/76 |

OTHER PUBLICATIONS

Marcuse, Dietrick, Mode Conversion in Optical Fibers with Monotonically Increasing Core Radius, Jan. 1987, Journal of Lightwave Technology, vol. LT-5, No. 1, pp. 125-133.*

* cited by examiner

*Primary Examiner* — Ryan Lepisto
*Assistant Examiner* — Erin Chiem
(74) *Attorney, Agent, or Firm* — Volentine & Whitt, PLLC (57) ABSTRACT

An expanded-beam all-glass retroreflector for a fiber laser cavity. The retroreflector consists of a section of a tapered double-clad fiber for beam expansion, e.g. a tapered section of the laser fiber itself, or a piece of coreless fiber spliced to the laser fiber, and a reflective surface for reflection of the expanded beam back into laser cavity through the tapered fiber section.

21 Claims, 6 Drawing Sheets

FIG. 1B
(Prior Art)

FIG. 1A
View A-A
(Prior Art)

TAPERED FIBER RETROREFLECTOR

TECHNICAL FIELD

The present invention is related to fiber lasers, and more specifically, to fiber laser cavity mirrors that provide a region for beam expansion, as well as a surface for retroreflection of at least a portion of the laser radiation.

BACKGROUND OF THE INVENTION

A fiber laser resonator cavity has a reflector at each end of a length of an optical fiber that includes a doped core surrounded by one or more cladding layers. Generally, one reflector is a high reflector, having a reflectivity of close to 100% at the lasing wavelength, and the other reflector serves as the output coupler and typically has a reflectivity between 0.5% and 50% at the lasing wavelength. Reflectors can be formed by simply cleaving or polishing the ends of the fiber near perpendicular to the fiber axis and, if necessary, applying a coating to achieve a desired reflectivity. In most fiber lasers the desired output-coupler reflectivity is in the 1-10% range. The precise value has insignificant impact on the fiber laser performance; therefore, one very inexpensive, robust, and frequently-used option for the output coupler is to utilize the normal-incidence Fresnel reflectivity of the uncoated surface of around 4%, depending upon the refractive index of the fiber core.

In fiber lasers operating at high average power or high peak power, it can be deleterious for the unexpanded beam from the fiber core to impinge directly on the fiber end surface, whether coated or uncoated. Most often, the fiber core has a diameter between 5 microns and 30 microns, with a correspondingly small surface area; therefore at power levels of hundreds of Watts, the power density can approach 1 $GW/cm^2$, which is near the damage threshold of most fiber materials such as silica, particularly in the event of any slight surface imperfection or contamination.

A common technique used to reduce this high power density at a fiber end is to splice a short length of coreless fiber or rod onto the fiber end. Such a short length of fiber or rod is often referred to as a fiber end cap or a beam expander. In operation, a beam emitted from the fiber core, upon entering the end cap, ceases to be confined and expands as it traverses the end cap, exiting through the end cap surface with an increased beam diameter and correspondingly lower power density. The end cap is usually 0.1-5 millimeters long and increases the beam diameter up to 50-300 microns. Since the power density scales as the inverse square of the beam diameter, a 5-10 times increase in diameter will lower the power density by a factor of 25-100 times, greatly improving the reliability of the fiber tip.

In order to operate a fiber laser at high power levels with one or more fiber-end reflectors, either coated or uncoated, it would be desirable to incorporate a fiber end cap into the fiber end in order to reduce the power density. However, it is neither sufficient nor practicable to simply attach a conventional end cap to a reflective flat output surface. Indeed, the reflected light in this case would continue to expand as it passes back through the end cap, and the beam would not be coupled efficiently back into the fiber core.

For example, if for an output coupler end cap, a 10% reflective surface is used with 5% coupling efficiency, then 0.5% of the light incident on the end cap surface will be reflected and fed back into the oscillator, 9.5% of the light will be reflected and lost, and 90% of the light will be transmitted. For typical applications, the coupled fraction of the backreflected light should be at least 4-5%; otherwise the system would have insufficient feedback. Thus, the application of prior art end caps as output couplers for a high power fiber laser is inefficient resulting in a considerable amount of wasted light and poorly controlled lasing due to insufficient feedback.

An external bulk optic mirror can be used as an output coupler in a fiber laser. However, such a mirror has to be aligned with a high precision in an angular, as well as in a linear sense; moreover, the high accuracy of alignment would have to be maintained over the operational temperature range of the laser. A high degree of alignment stability is difficult to achieve, especially in high power lasers which generate large temperature gradients during normal operation. Moreover, when an external output coupler, such as an external concave mirror, is used for providing feedback into the fiber laser, there is an additional interface which the light must pass through in order to reflect off that external coupler and couple back into the fiber. Such an interface would exhibit a potential point of failure due to high optical power densities at the interface as has been explained above. Therefore, it is preferable that an output coupler of a fiber laser has no air gaps, or voids, for the laser light to pass through in its way from the fiber core towards the output coupler reflective surface; ideally, the output coupler would have to be bonded to the fiber directly, such that the laser light does not encounter a significant change of the index of refraction as it travels from the fiber core and towards the output coupler reflective surface.

It is an object of this invention to provide a monolithic end cap that will ensure that a sufficient fraction of the radiation reflected from the output surface of the end cap is coupled back into the fiber core.

It is also an object of the invention to provide an end cap with an efficiency that would couple at least 50% of the backreflected light back into the fiber core. This high coupling efficiency is achieved without having to rely on often difficult and tedious alignment of external optical elements. Prior to this invention, it would have been very difficult to achieve the required precision in transverse, longitudinal, and angular alignment of an external bulk optic mirror to achieve efficient coupling of the reflected light back into the laser core.

SUMMARY OF THE INVENTION

In accordance with the invention there is provided a tapered fiber retroreflector comprising:
a fiber having a diameter; and
a tapered section located at an end of the fiber, having
a core having a refractive index $n_0$;
a first cladding means surrounding the core, the first cladding means having a refractive index $n_1$;
a second cladding means surrounding the first cladding means, the second cladding means having a refractive index $n_2$ wherein $n_0$, $n_1$, and $n_2$ are such that $n_0 > n_1 > n_2$;
a beginning having a beginning diameter;
an end having an end diameter; and
a length therebetween,
wherein the diameter of the tapered section gradually decreases over the length thereof, from the beginning diameter to the end diameter thereof, such that a core-confined light, traveling from the beginning to the end of the tapered section, ceases to be substantially confined to the core, expands into the first cladding means, and becomes substantially guided by a fiber formed by the first cladding means and the second cladding means; and wherein said tapered section has a reflective surface at the end thereof for reflecting a light back through said tapered section, so that the reflected light is coupled back into a core mode of the fiber.

In accordance with another aspect of the invention there is provided a tapered fiber retroreflector comprising:
a fiber having a diameter; and
a tapered section located at an end of the fiber, having
a core having a refractive index $n_0$,
a first cladding means surrounding the core, the first cladding means having a refractive index $n_1$;
a second cladding means surrounding the first cladding means, the second cladding means having a refractive index $n_2$;
wherein $n_0$, $n_1$, and $n_2$ are such that $n_0 > n_1 > n_2$;
a beginning having a beginning diameter;
an end having an end diameter; and
a length therebetween,
wherein the diameter of the tapered section gradually decreases over the length thereof, from the beginning diameter to the end diameter thereof, such that a core light mode, traveling from the beginning to the end of the tapered section, ceases to be substantially confined to the core, expands into the first cladding means, and becomes substantially guided by a fiber formed by the first cladding means and the second cladding means; and
a straight section having
a core having a diameter;
a cladding means surrounding the core, the cladding means having:
a diameter;
a beginning;
an end;
wherein:
the beginning of the straight section is spliced to the end of the tapered section,
the diameter of the core and the cladding means of the straight section are matched to a diameter of the first cladding means and the end diameter of the tapered section, respectively;
said straight section ends with a reflective surface for reflecting a light back through the straight section and through the tapered section, so that the reflected light is coupled back into a core mode of the fiber.

In accordance with yet another aspect of the present invention there is further provided a fiber laser resonator cavity comprising:
an optical fiber having an active core for light amplification, wherein said fiber has at least one double-clad tapered section at an end thereof;
wherein a diameter of the tapered section gradually decreases over a length thereof, from a beginning to an end thereof, such that a core light mode, traveling from the beginning to the end of the tapered section, ceases to be substantially confined to a core, expands into a first cladding, and becomes substantially guided by a fiber formed by first and second claddings of said double-clad tapered section of the optical fiber.

BRIEF DESCRIPTION OF THE DRAWINGS

Exemplary embodiments will now be described in conjunction with the drawings in which:
FIGS. 1A and 1B are schematic views of a prior-art fiber laser resonator cavity, wherein

DETAILED DESCRIPTION OF THE INVENTION

Figure 1A:
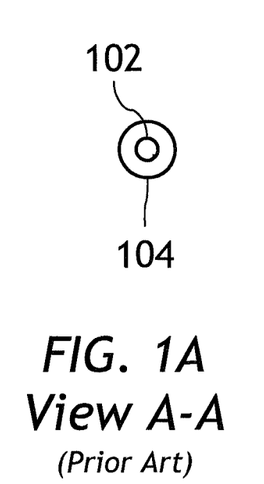
FIG. 1A is a cross section taken along the line A-A through FIG. 1B.

Referring to FIG. 1A, a prior art optical fiber, having a core 102 and cladding 104, is shown. FIG. 1A is a cross section taken along the line A-A through FIG. 1B.

Figure 1B:
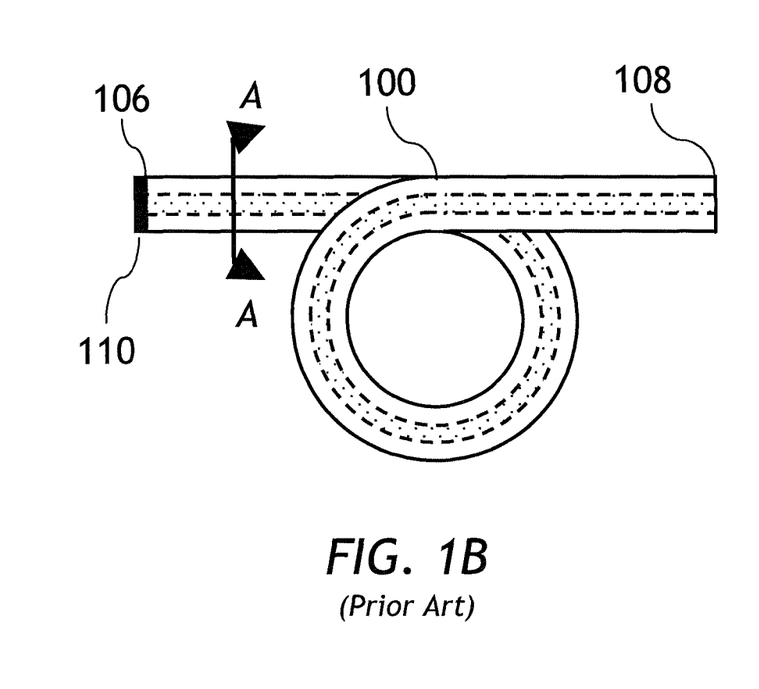

In FIG. 1B, a prior art fiber laser cavity is shown wherein an optical fiber 100 is cleaved at ends 106 and 108. A high reflector coating 110 is applied to the end 106, and the end 108 is left uncoated.

Figure 2:
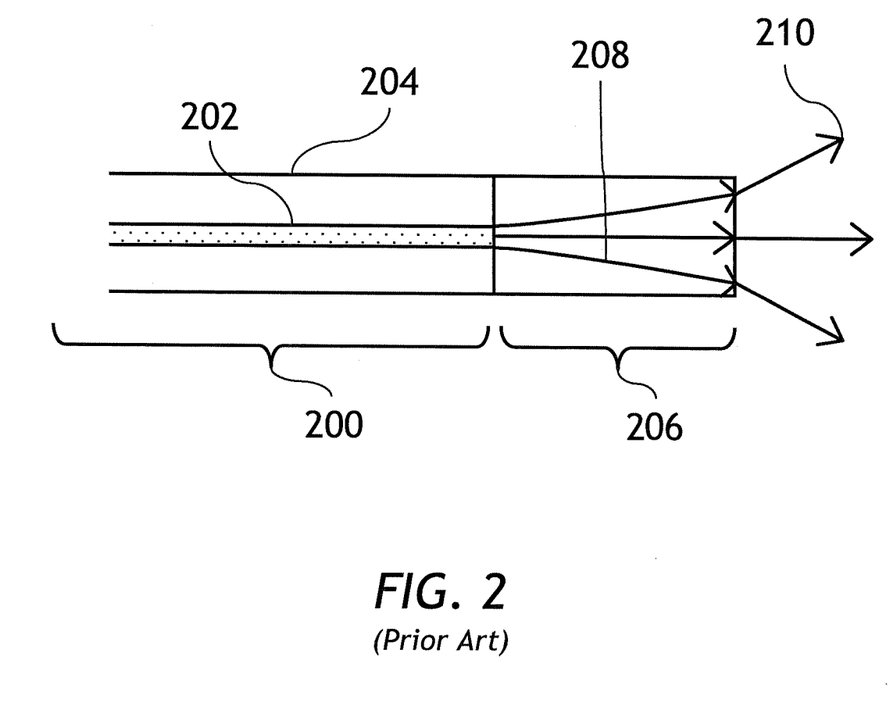
FIG. 2 is a schematic view of a prior-art fiber end cap.

FIG. 2 represents a prior art fiber end cap consisting of a fiber section 200 and end cap section 206. The fiber section 200 consists of a fiber core 202 and fiber cladding 204. An expanding optical beam 208 propagates inside the end cap section 206. In operation, the optical beam 208 exits the end cap section 206 and continues to propagate in free space, as is schematically illustrated by arrows 210.

Figure 3:
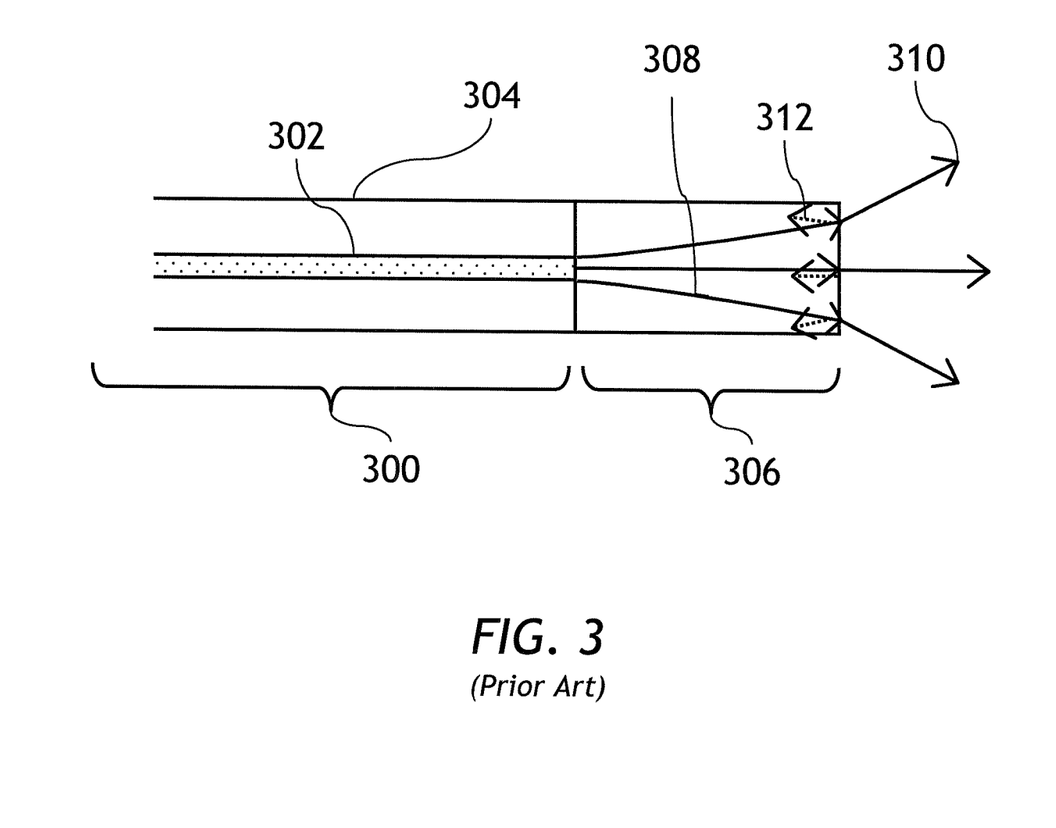
FIG. 3 represents a prior-art fiber output coupler with flat output surface.

FIG. 3 illustrates a prior art fiber laser output coupler consisting of a fiber section 300 and an end cap section 306. The fiber section 300 consists of fiber core 302 and fiber cladding 304. An expanding optical beam 308 propagates inside the end cap section 306. The optical beam 308 splits at the end of the end cap section 306 into outwards propagating beam 310 and retroreflected diverging beam 312.

Figure 4:
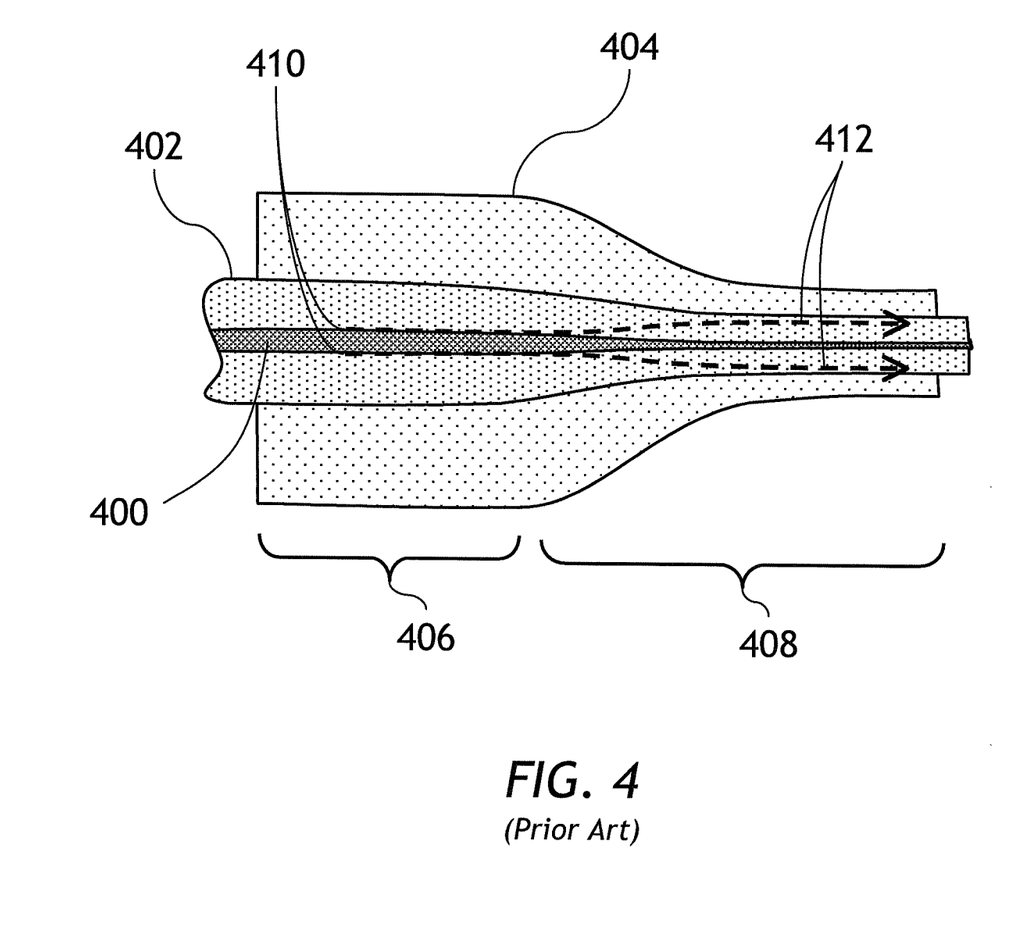
FIG. 4 shows a prior art fiber taper.

Referring to FIG. 4, a prior art fiber taper is shown having a core 400, a first cladding 402, and a second cladding 404. The taper of FIG. 4 consists of two sections, a straight section 406 and a tapered section 408. A core-confined optical beam represented by dashed lines 410, propagating from a straight section 406 towards the tapered section 408, upon entering said tapered section 408, ceases to be guided by the core 400 and expands into the first cladding 402 as schematically shown by the dashed arrowed lines 412. At the end of tapered section 408, the beam represented by the lines 412 is guided by a waveguide formed by the first cladding 402 and the second cladding 404.

Figure 5:
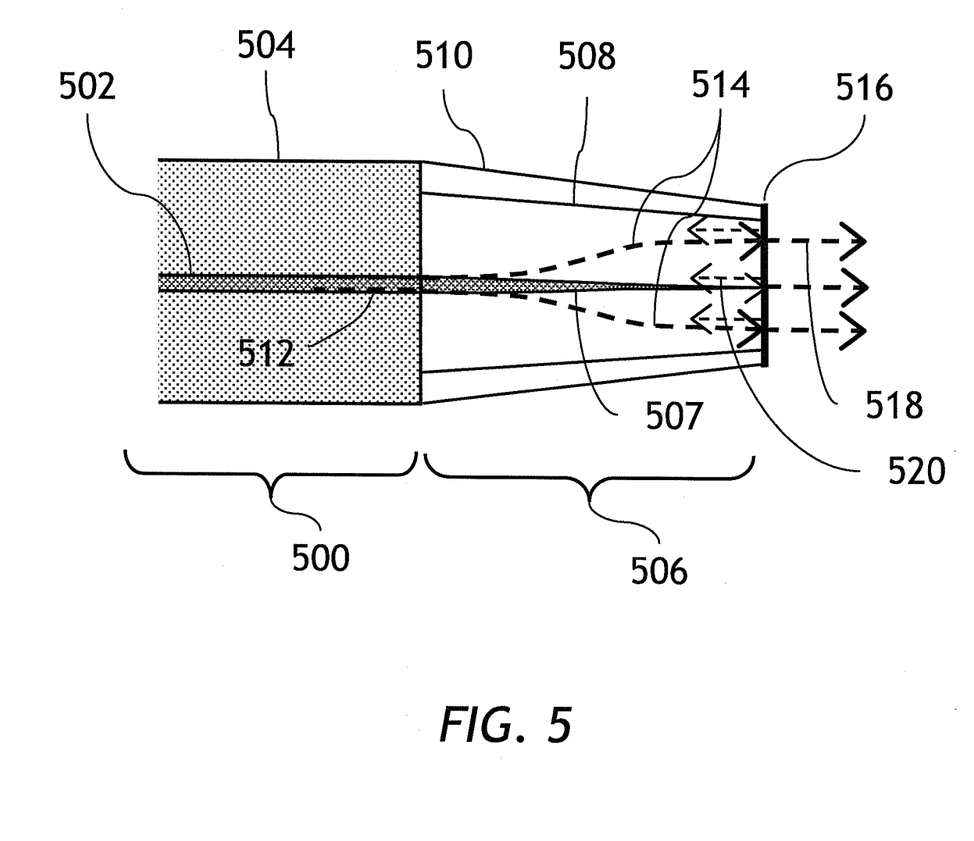
FIG. 5 is a schematic view of one embodiment of a tapered fiber retroreflector of present invention.

Turning now to FIG. 5, a fiber retroreflector of present invention is shown consisting of a straight fiber section 500 comprising a core 502 and a cladding 504, and an end cap made in the form of a downward-tapered fiber section 506 featuring a double cladding structure consisting of a core 507 surrounded by an inner (first) cladding 508 surrounded by an outer (second) cladding 510. A partially reflective surface 516 is located at the end of tapered section 506.

The downward-tapered fiber section 506 can either be fabricated directly in the end of the straight fiber section 500, or it can be fabricated in a short piece of stand-alone fiber that is subsequently spliced onto an end of the straight fiber section 500. For best centration, the outside diameter of the input end of the downward-tapered fiber section 506 should match the outside diameter of the straight fiber section 500, but reasonable performance should still be achievable even if the end cap 506 is smaller or larger than the laser fiber. The glass cladding layer of the fiber in this case should preferably be surrounded by a lower-index medium, which could be, for example, either air or a second, lower-index cladding layer.

The fiber retroreflector of FIG. 5 functions as follows. A core-guided laser beam, represented by dashed lines 512, propagates in the straight fiber section 500 towards the end cap section 506, enters the latter section, and starts propagating along the core 507. As the fiber of the section 506 tapers down, however, the core 507 core gets smaller and smaller. Thus, the laser beam 514 propagating inside the tapered section 506 is progressively less and less confined inside the core 507. After the fiber 506 has been tapered down by about a factor of two or more, the laser beam 514 is mostly no longer confined inside the core 507 and has migrated into the inner cladding 508, where it is confined substantially by the outer cladding layer 510 (or other low-index boundary) and has a much larger diameter than when it was guided by the core 502. This beam now exits the end cap 506 at the output surface 516, which may be fabricated by cleaving or polishing followed by coating if required. The exiting beam is represented by dashed arrows 518. Since the beam 518 is collimated at the output face 516, the desired fraction of the beam that is reflected by the output surface 516 will retrace its path through the taper and re-enter the core of the laser fiber with high efficiency. The reflected beam fraction is represented by dashed arrows 520.

For example, consider an end-cap fiber with a core radius of a=7.5 micron, core NA=0.05, 400 micron diameter, 0.22 NA first cladding, and 480 micron diameter second cladding, for which the V-number in the core is $$V=2\pi a\, NA/\lambda=2.14$$

at a wavelength of $\lambda=1.1$ microns, which is stably single-mode and robustly confining. The fiber 500 can be tapered down by a factor of 3, using techniques well known in the art, so that at the output surface 516, the diameter of first cladding 508 is 133.3 microns, the diameter of second cladding 510 is 160 microns, and the core 507 is 5 microns so the V-number in the core is only 0.71 and the laser beam 514 is essentially no longer trapped substantially inside the core 507. Instead it is trapped mostly inside the first cladding 508 due to presence of the second cladding 510, which at the output surface 516 will have a wall thickness of 13.3 microns, which together with the NA of 0.22 is adequate to ensure that the beam 514 will be well confined. The beam size at the output surface, measured to $1/e^2$, will be about 75% of the diameter of the first cladding, or 100 microns in the current example, which is well matched to the desired amount of beam expansion.

It is preferable that the V-number of the end-cap fiber section 506 be close to or below the single-mode cutoff value of V=2.405; if V is too high, then too much of a taper will be required to reduce the fiber to a sufficiently low V that the beam 514 is substantially released from the core and fills the first cladding 508, and the first cladding 508 may no longer be large enough to give the desired amount of beam expansion. Thus, for example, if a laser fiber has a 15 micron diameter, 0.07 NA core, with V=3.0, then rather than implementing the taper 506 directly in this fiber, it is preferable to implement the taper 506 in a piece of 15 micron diameter, 0.05 NA core fiber that is spliced onto the straight fiber section 500, with V=2.14, as described above. With a carefully executed splice, the transition between the two fibers can have minimal loss. It is also important that the taper 506 be gradual enough that the transition of the beam from inside the core 507 to inside the first cladding 508 occurs adiabatically, so that the beam quality is maintained and the backreflected beam 520 is well coupled back into the core 507 as it moves backwards through the tapered section 506 towards the straight fiber section 500. Typically the taper should be several millimeters long in order for the transition to be adiabatic. It is to be understood, however, that the scope of the present invention is not limited to the adiabatic tapers only; a non-adiabatic taper can function as an end cap as well. In case of non-adiabatic taper, the length of the tapered section becomes important, as one has to make sure that multiple modes, present in a non-adiabatic coupler, add up so as to effectively couple reflected light 520 back into a core mode of the straight section 500.

Thus, the adiabatic coupler embodiment has the advantage over the non-adiabatic embodiment in that it does not require precise control of end-cap length. Because of the adiabatic nature of the beam expansion, the beam 514 inside the end cap 506 is always confined and close to parallel to the axis of the end cap 506, and therefore perpendicular to a normal-incidence output surface 516 of the end cap 506, so that the reflected beam 520 will always be efficiently coupled back into the fiber core 502. It has the disadvantages that the end cap 506 will typically be somewhat longer due to the need to maintain adiabaticity, and the quality of the output beam 518 may not be as high, because the beam 518 will be somewhat distorted by the residual core 507 inside the tapered section 506. This last disadvantage can be alleviated as described below.

Figure 6:
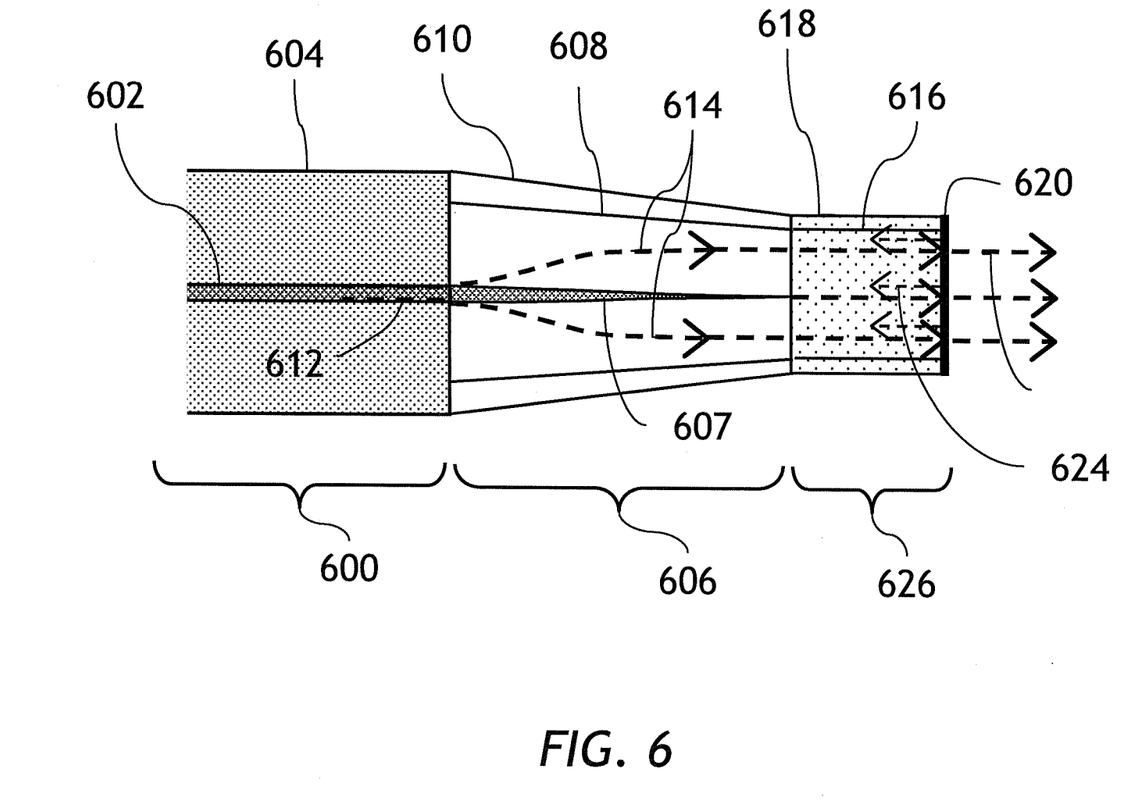
FIG. 6 is a representation of another embodiment of a tapered fiber retroreflector of present invention.

FIG. 6 illustrates an alternative embodiment of present invention. A fiber retroreflector of FIG. 6 consists of three fiber sections attached to each other in the following order: a straight section 600 is attached to a downward-tapered section 606 which is attached to a coreless section 626. The fiber of the straight section 600 comprises a core 602 surrounded by a cladding 604. The tapered section 606 features a double-cladding structure consisting of a core 607 surrounded by an inner (first) cladding 608 surrounded by an outer (second) cladding 610. Finally, the coreless section 626 features an inner cladding 616, an outer cladding 618, and a partially-reflective surface 620 located at the free end of the section 626. The respective parameters of inner and outer claddings of sections 626 and 606 are matched to each other, except that, of course, the coreless section 626 lacks the central core.

The operation of the fiber retroreflector of FIG. 6 will now be explained. An optical beam 612 propagates in the core 602 of straight section 600 towards the tapered section 606. Upon entering said tapered section 606, the beam 612 ceases to be confined to the core 607 and expands into the first cladding 608 of the tapered section 606, as schematically shown by the dashed arrows 614. Upon expansion into the first cladding 608, the beam 614 becomes substantially guided by a waveguide formed by the first cladding 608 and the second cladding 610 of the tapered section 606. As has been mentioned above, the quality of expanded beam 614 in tapered section 606 is somewhat compromised by the presence of the core 607. When the beam 614 enters the coreless section 626, its quality is improved since no core is present in the section 626. At a partial reflector 620, the beam splits in two beams: outward-propagating free-space beam 622 and retroreflected beam 624. The retroreflected beam 624 travels back through tapered section 606 and is coupled into a core mode of the straight section 600.

The values of reflectivity of the surface 516 of FIG. 5 or the surface 620 of FIG. 6 can vary depending on a particular fiber laser design and on whether the fiber retroreflector is used as an output fiber coupler or a high reflector in a fiber laser cavity. For example, the reflectivity can be either in the range of 0.5% to 50% which is typical for an output coupler application, or 90%-100% which is more appropriate to using the fiber retroreflector as a high reflector. On the other hand, the reflectivities between 50% and 90% may also be found useful and cost effective in an application where the efficiency of coupling of the reflected portion of light through the tapered section is not very high due to, for example, relaxed manufacturing tolerances or distortions of the expanded beam by the tapered fiber core.

The embodiments of FIG. 5 and FIG. 6 may both be improved by providing a short heat treatment to the output surface in order to momentarily melt the surface and eliminate any small cracks or defects while avoiding undesired curvature of the surface due to surface tension.

What is claimed is:

1. A fiber retroreflector comprising:
a fiber having a diameter; and
a tapered section located at an end of the fiber, having
a core having a refractive index $n_0$;
a first cladding means surrounding the core, the first cladding means having a refractive index $n_1$;
a second cladding means surrounding the first cladding means, the second cladding means having a refractive index $n_2$, wherein $n_0$, $n_1$, and $n_2$ are such that $n_0 > n_1 > n_2$;
a beginning having a beginning diameter;
an end having an end diameter; and
a length therebetween,
wherein the diameter of the tapered section gradually decreases over the length thereof, from the beginning diameter to the end diameter thereof, such that a substantially singlemode core-confined light, traveling from the beginning to the end of the tapered section, ceases to be substantially confined to the core, expands into the first cladding means, and becomes guided, while remaining substantially singlemode, by a waveguide formed by the first cladding means and the second cladding means; and
wherein said tapered section has a reflective surface at the end thereof for reflecting a light back through said tapered section, so that the reflected light is coupled back into a core mode of the fiber.

2. A fiber retroreflector of claim 1, wherein the fiber has a double-clad structure, and wherein the tapered section is fabricated in the fiber itself.

3. A fiber retroreflector of claim 1, wherein the tapered section is fabricated in a piece of a stand-alone fiber which is subsequently spliced onto an end of the fiber.

4. A fiber retroreflector of claim 3, wherein the beginning diameter of the tapered section is between 90% and 110% of the diameter of the fiber.

5. A fiber laser resonator cavity, comprising:
an optical fiber having an active section for light amplification;
a fiber retroreflector of claim 3 fused to said optical fiber.

6. A fiber retroreflector of claim 1, further comprising a thin film coating applied to the reflective surface for modifying a reflection coefficient of said surface.

7. A fiber retroreflector of claim 6, wherein said thin film coating has a reflectivity between 0.5% and 50%.

8. A fiber retroreflector of claim 6, wherein said thin film coating has a reflectivity between 50% and 90%.

9. A fiber retroreflector of claim 6, wherein said thin film coating has a reflectivity between 90% and 100%.

10. A fiber retroreflector of claim 1, wherein the second cladding means is air.

11. A fiber retroreflector of claim 1, wherein the V-number of the beginning of the tapered section is below 110% of a cutoff value of 2.405.

12. A fiber retroreflector of claim 1, wherein the tapered section is long enough so that a transition of the light from being substantially confined to the core to being substantially guided by the first cladding is adiabatic.

13. A fiber laser resonator cavity, comprising:
an optical fiber having an active section for light amplification;
a fiber retroreflector of claim 12 fused to said optical fiber.

14. A fiber retroreflector of claim 1, wherein the reflective surface is melted briefly, so that any small cracks and defects, which may be present on the surface, are eliminated, while undesired curvature of the surface due to surface tension is avoided.

15. A fiber laser resonator cavity, comprising:
an optical fiber having an active section for light amplification;
a fiber retroreflector of claim 1 fused to said optical fiber.

16. A fiber laser resonator cavity comprising an optical fiber having an active core for light amplification, wherein said fiber has at least one double-clad tapered section at an end thereof;
wherein a diameter of the tapered section gradually decreases over a length thereof, from a beginning to an end thereof, such that a core-confined single light mode, traveling from the beginning to the end of the tapered section, ceases to be substantially confined to a core, expands into a first cladding, and becomes guided, while remaining substantially singlemode, by a waveguide formed by first and second claddings of said double-clad tapered section of the optical fiber.

17. A fiber laser resonator cavity of claim 16, wherein said tapered section has a reflective surface at a free end thereof for reflecting a light back through said tapered section, so that the reflected light is coupled back into a core light mode of the fiber.

18. A fiber laser resonator cavity of claim 17, wherein said reflective surface is coated with a thin film coating having a reflectivity between 0.5% and 50%.

19. A fiber laser resonator cavity of claim 17, wherein said reflective surface is coated with a thin film coating having a reflectivity between 50% and 100%.

20. A fiber laser resonator cavity of claim 16, further comprising a straight section spliced to the end of the tapered section, wherein said straight section has a reflective surface at a free end thereof.

21. A fiber laser resonator cavity of claim 20, wherein said reflective surface is coated with a thin film coating having a reflectivity between 0.5% and 50%.

* * * * *